United States Patent
Liu et al.

(10) Patent No.: US 11,614,962 B2
(45) Date of Patent: Mar. 28, 2023

(54) SCHEDULING VEHICLE TASK OFFLOADING AND TRIGGERING A BACKOFF PERIOD

(71) Applicant: Toyota Motor Engineering & Manufacturing North America, Inc., Plano, TX (US)

(72) Inventors: Qiang Liu, Charlotte, NC (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 204 days.

(21) Appl. No.: 16/911,585

(22) Filed: Jun. 25, 2020

(65) Prior Publication Data

US 2021/0406065 A1    Dec. 30, 2021

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/5038* (2013.01); *G06F 9/5077* (2013.01);
(Continued)

(58) Field of Classification Search
CPC .... G06F 9/4881; G06F 9/5038; G06F 9/5077; G06F 2209/509; G06F 2209/5017;
(Continued)

(56) References Cited

U.S. PATENT DOCUMENTS 9,332,261 B2   5/2016  Yousefi et al.
9,743,447 B2 * 8/2017  Kim ................. H04W 28/0215
(Continued)

FOREIGN PATENT DOCUMENTS

WO    2019209154 A1    10/2019

OTHER PUBLICATIONS

Dai et al. A scheduling algorithm for autonomous driving tasks on mobile edge computing servers, Mar. 2019 [retrieved on Apr. 22, 2022] Retreived from <URL:https://www.sciencedirect.com/science/article/pii/S1383762118304831>, pp. 14-23 (Year: 2019).*
(Continued)

*Primary Examiner* — Meng Ai T An
*Assistant Examiner* — Hsing Chun Lin
(74) *Attorney, Agent, or Firm* — Christopher G. Darrow; Darrow Mustafa PC

(57) ABSTRACT

System, methods, and other embodiments described herein relate to improving scheduling of computing tasks in a mobile environment for a vehicle. In one embodiment, a method includes receiving an offloading request associated with a computing task from the vehicle, wherein the offloading request includes context information and a task descriptor related to the computing task. The method also includes scheduling the computing task to execute on a server if the context information and the task descriptor satisfy criteria for using computing resources associated with the server for the vehicle. The method also includes partitioning the computing task into subtasks if the context information satisfies the criteria. A machine learning module may decide partitions of the computing task according to the context information. The method also includes sending a scheduling signal including a scheduling message to the vehicle and the scheduling message includes scheduling
(Continued)

information and task partition information associated with offloading the subtasks.

20 Claims, 6 Drawing Sheets

(51) Int. Cl.
*G06K 9/62* (2022.01)
*H04L 67/12* (2022.01)
*G06N 20/00* (2019.01)

(52) U.S. Cl.
CPC ............ *G06K 9/6262* (2013.01); *G06N 20/00* (2019.01); *H04L 67/12* (2013.01); *G06F 2209/509* (2013.01)

(58) Field of Classification Search
CPC ...... G06F 9/505; G06K 9/6262; G06N 20/00; G06N 3/006; G06N 3/063; G06N 3/088; G06N 3/0454; H04L 67/12
See application file for complete search history.

(56) References Cited

U.S. PATENT DOCUMENTS 10,489,222 B2  11/2019  Sathyanarayana et al.
2013/0078945 A1  3/2013  Lavi et al.
2017/0083179 A1  3/2017  Gruber et al.

OTHER PUBLICATIONS

Lin et al. A Time-Driven Workflow Scheduling Strategy for Reasoning Tasks of Autonomous Driving in Edge Environment, Dec. 2019 [retrieved on Apr. 22, 2022] Retreived from <URL:https://ieeexplore.ieee.org/stamp/stamp.jsp?tp=&arnumber=9047475 >, pp. 124-131 (Year: 2019).*

Abd-El-Malek et al. Fault-Scalable Byzantine Fault-Tolerant Services, 2005, [retrieved on Nov. 3, 2022] Retreived from <URL:https://dl.acm.org/doi/pdf/10.1145/1095809.1095817>, pp. 59-74 (Year: 2005).*

Sun et al., "Adaptive Learning-Based Task Offloading for Vehicular Edge Computing Systems," IEEE Transactions on Vehicular Technology, pp. 1-13, arXiv:1901.05205v1 [cs.IT] Jan. 16, 2019.

Varshney et al., "Characterizing Application Scheduling on Edge, Fog and Cloud Computing Resources," pp. 1-58, arXiv:1904. 10125v1 [cs.DC] Apr. 23, 2019.

Suzhen Lin, "Feedback-based task scheduling in real-time systems," Retrospective Theses and Dissertations, 2005) pp. 1-119, Pub. Digital Repository, Iowa State University.

Chang et al., "Internet of Things (IoT) and New Computing Paradigms," Fog and Edge Computing: Principles and Paradigms, (2019) pp. 1-23, Pub. John Wiley & Son's Inc, Hoboken, NJ.

* cited by examiner

SCHEDULING VEHICLE TASK OFFLOADING AND TRIGGERING A BACKOFF PERIOD

TECHNICAL FIELD

The subject matter described herein relates, in general, to schedule computing tasks, and, more particularly, to improving the scheduling of computing tasks within a vehicle to execute on a server.

BACKGROUND

Vehicles equipped with current computing systems may need to process complex computing tasks in an intelligent transportation system (ITS). For example, autonomous driving modules used for automated driving as part of an automated driving system (ADS) may process complex computing tasks to detect objects in a driving environment and maneuver a vehicle. Vehicles equipped with light detection and ranging (LiDAR) sensors and cameras for automated driving may generate terabytes of data to detect and understand a road, traffic, pedestrians, or the like in the driving environment. On-board vehicle systems processing the generated data for object detection, tracking, or the like may cause delays because of the complexity and size of a computing task.

Computing tasks associated with the generated data may be offloaded by a vehicle for scheduling and processing at cloud and edge servers to reduce system delays. Dedicated short-range communication (DSRC) and cellular networks, for example, may be used by the vehicle to accelerate task processing by wirelessly sending the computing task to a nearby edge server. In this configuration, powerful computing servers in centralized data centers or distributed network edge servers may schedule and process complex computing tasks offloaded by the vehicle. Fully offloading vehicle computing tasks to a server for execution may excessively use wireless transmission bandwidth and system resources. Also, local processing of most tasks on the vehicle could lead to system delays due to limited computing power, memory resources, storage size, bandwidth, or the like.

Current scheduling systems may be ineffective or inefficient at minimizing system delays of tasks uploaded to a server by vehicles. For example, one vehicle may exploit and excessively use resources on a server for performance-oriented scheduling systems. Poor wireless coverage may also cause scheduling delays when attempting to satisfy a quality of service (QoS) for a vehicle. Furthermore, scheduling systems may also have difficulties dynamically scheduling computing tasks in an area with many vehicles moving simultaneously. Moreover, scheduling systems may have challenges at scheduling according to different configurations and capabilities for each vehicle in an area.

SUMMARY

In one embodiment, example systems and methods relate to a manner of improving the scheduling of computing tasks of a vehicle to execute on a server. A scheduling system efficiently scheduling an offloaded computing task may be suboptimal at fairly reducing delays. In one approach, a scheduling system may allocate the server resources for offloaded computing tasks more efficiently by analyzing context information of a vehicle and machine learning. Therefore, an improved scheduling system is disclosed that schedules computing tasks in a manner that reduces end-to-end delay and improves fairness by analyzing the context information associated with the vehicle. In one approach, a scheduling system may fairly allocate resources of a server using machine learning. Moreover, the scheduling system may schedule a computing task such that context information and a task descriptor in an offloading request satisfy fair resource loading between the vehicle and the server. In one approach, the computing task may be partitioned into subtasks by a machine learning module according to the context information. A scheduling message is sent to the vehicle with scheduling and task partition information to offload subtasks to the server for execution. Thus, the scheduling system uses context information and machine learning to improve resource usage for the server for offloaded computing tasks to reduce delays and fairly allocate resources.

In one embodiment, a scheduling system for improving the scheduling of computing tasks of a vehicle in a mobile environment is disclosed. The scheduling system includes one or more processors and a memory communicably coupled to the one or more processors. The memory stores a scheduling module including instructions that when executed by the one or more processors cause the one or more processors to receive an offloading request associated with a computing task from the vehicle, wherein the offloading request includes context information and a task descriptor related to the computing task. The scheduling module also includes instructions to schedule the computing task to execute on a server if the context information and the task descriptor satisfy criteria for using computing resources associated with the server for the vehicle. The memory stores a partitioning module including instructions that when executed by the one or more processors cause the one or more processors to partition the computing task into subtasks if the context information satisfies the criteria, wherein the partition of the computing task includes using a machine learning module that decides partitions of the computing task according to the context information. The scheduling module also includes instructions to send a scheduling signal including a scheduling message to the vehicle, wherein the scheduling message includes scheduling information and task partition information associated with offloading the subtasks.

In one embodiment, a non-transitory computer-readable medium for improving scheduling of computing tasks of a vehicle in a mobile environment and including instructions that when executed by one or more processors cause the one or more processors to perform one or more functions is disclosed. The instructions include instructions to receive an offloading request associated with a computing task from the vehicle, wherein the offloading request includes context information and a task descriptor related to the computing task. The instructions also include instructions to schedule the computing task to execute on a server if the context information and the task descriptor satisfy criteria for using computing resources associated with the server for the vehicle. The instructions also include instructions to partition the computing task into subtasks if the context information satisfies the criteria, wherein the partition of the computing task includes using a machine learning module to decide partitions of the computing task according to the context information. The instructions also include instructions to send a scheduling signal including a scheduling message to the vehicle, wherein the scheduling message includes scheduling information and task partition information associated with offloading the subtasks.

In one embodiment, a method for improving scheduling of computing tasks of a vehicle in a mobile environment is disclosed. In one embodiment, the method includes receiving an offloading request associated with a computing task from the vehicle, wherein the offloading request includes context information and a task descriptor related to the computing task. The method also includes scheduling the computing task to execute on a server if the context information and the task descriptor satisfy criteria for using computing resources associated with the server for the vehicle. The method also includes partitioning the computing task into subtasks if the context information satisfies the criteria, wherein the partitioning includes using a machine learning module that decides partitions of the computing task according to the context information. The method also includes sending a scheduling signal including a scheduling message to the vehicle, wherein the scheduling message includes scheduling information and task partition information associated with offloading the subtasks.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
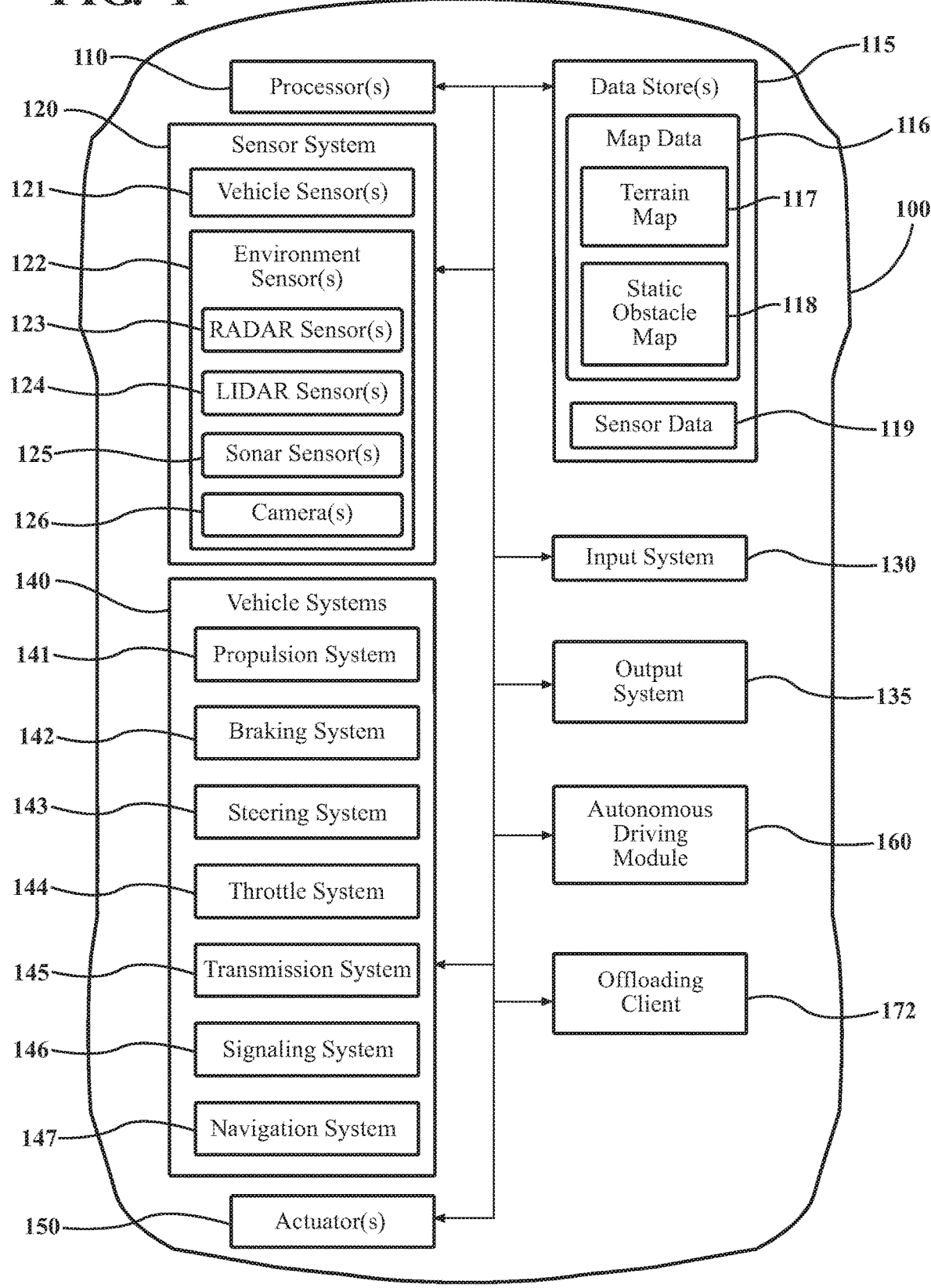
FIG. 1 illustrates one embodiment of a vehicle within which systems and methods disclosed herein may be implemented.

Systems, methods, and other embodiments associated with improving the scheduling of computing tasks within a vehicle to execute on a server are disclosed herein. In one embodiment, a scheduling system improves scheduling of computing tasks on a server by analyzing context information associated with a vehicle to reduce delays and optimize server resources. A server may be a nearby edge server, a part of distributed network edge servers, or a cloud computing device with powerful processing capabilities to execute complex computing tasks. The complex computing tasks may be associated with operations of automated driving systems (ADS), intelligent transportation systems (ITS), or the like for which the scheduling system can improve scheduling and offloading to the server. The scheduling system can use criteria, in one or more approaches, to weigh computing capabilities of the vehicle, computing capabilities of the server, current delay requirements of the computing task, computing task size, or the like in a time slot as a manner of assessing how to schedule computing tasks. The scheduling system also uses, in one approach, machine learning to fairly allocate resources on the server according to the context information.

Consider that the scheduling system may receive various information from the vehicle in an offloading request. The scheduling system may derive context information and a task descriptor to determine the complexity of a computing task and vehicle capabilities. In this way, the scheduling system more effectively schedules server resources in a network since the vehicle may already have the computing power and memory to efficiently execute a complex computing task.

Furthermore, the scheduling system may also determine that the complex computing task should be executed on the server according to current wireless channel conditions, network traffic, delay requirements of the vehicle, or the like. For example, the criteria for executing the computing task on the server may be that a current computing task has a critical delay requirement that cannot be satisfied by the computing resources of the vehicle. Thus, analyzing context information associated with the complex computing task allows the scheduling system to more effectively decide if a computing task should be executed on a server or a vehicle.

The scheduling system, in at least one approach, may also partition the computing task into subtasks if the criteria are satisfied so that resources on the server are allocated more fairly and efficiently. For example, a subtask may be perception, planning, controlling, or the like associated with autonomously driving a vehicle. The scheduling system, in one approach, may also use a machine learning module to decide partitions of the computing task into subtasks according to the context information. The machine learning module provides fair scheduling so that a complex and large computing task of a vehicle does not overload a server.

In addition, the scheduling system may send a scheduling message to an offloading client on the vehicle that includes scheduling information and task partition information associated with offloading the subtask. The vehicle partitions the complex computing and sends the subtask to the server for execution. The subtask is executed on the server and the results are transmitted to the vehicle within an end-to-end delay requirement. Thus, the scheduling system manages vehicle and server computing resources more efficiently and fairly to execute a complex computing task by analyzing context information and using machine learning to reduce end-to-end delay.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects to operate in automated driving system (ADS) mode. As further described herein, an ADS may comprise the autonomous driving module(s) (ADM) 160, the parts of the sensor system 120, the parts of the vehicle systems 140, the actuators 150, and the data store(s) 115 that operate together to autonomously drive and control the vehicle 100 in ADS mode. In ADS mode, the vehicle 100 may encounter complex or critical computing tasks that need offloading to a server for execution to meet the quality of service (QoS) or delay requirements.

The vehicle 100 also includes various elements. It will be understood that in various embodiments, the vehicle 100 having all of the elements shown in FIG. 1 may be unnecessary. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 operates in an environment with improved scheduling of complex computing tasks within the vehicle 100 that may get executed in part on a server. The complex computing tasks are scheduled by the scheduling system to fairly optimize delays in the network for one or more vehicles in an area.

Figure 2:
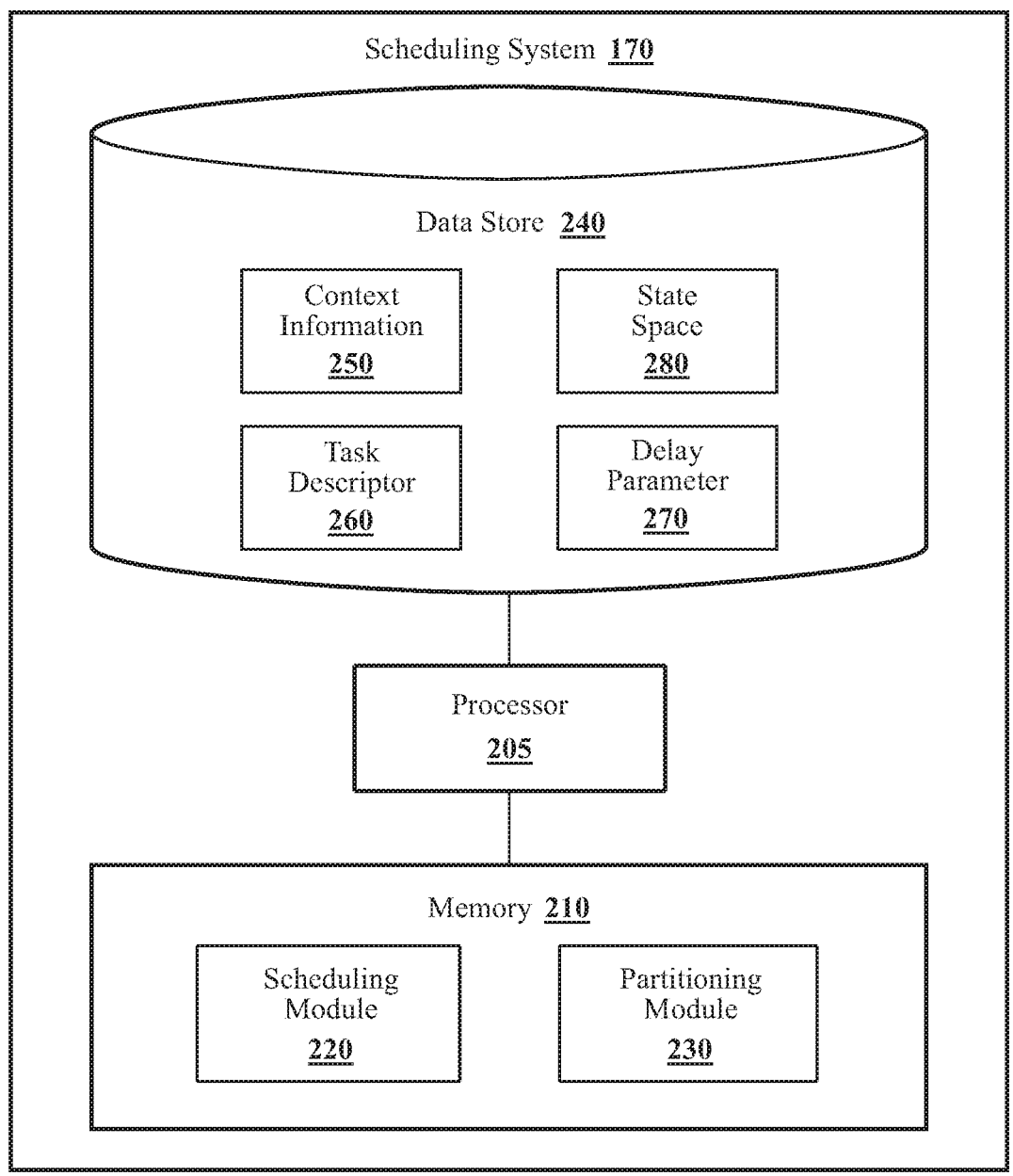
FIG. 2 illustrates one embodiment of a scheduling system that is associated with scheduling computing tasks within the vehicle of FIG. 1 to execute on a server.

FIG. 2 illustrates one embodiment of a scheduling system that is associated with scheduling computing tasks within the vehicle of FIG. 1 to execute on a server. The scheduling system 170 is shown as including a processor 205. For example, the processor 205 can be an application-specific integrated circuit (ASIC), a microprocessor, a microcontroller, a field-programmable gate array (FPGA), a multi-core processor, or the like. The scheduling system 170 may communicate with offloading client 172 for receiving offloading requests and sending a scheduling message according to an offloading criteria. The processor 205 may be a part of the scheduling system 170, the scheduling system 170 may include a separate processor from the processor 205. In one embodiment, the scheduling system 170 includes a memory 210 that stores a scheduling module 220 and a partitioning module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 205 cause the processor 205 to perform the various functions disclosed herein.

Moreover, in one embodiment, the scheduling system 170 includes a data store 240. In one embodiment, the data store 240 is a database. The database is, in one or more embodiments, an electronic data structure stored in the memory 210 or another data store and that is configured with routines that can be executed by the processor 205 for analyzing stored data, providing stored data, organizing stored data, and so on. Thus, in one embodiment, the data store 240 stores data used by the modules 220 and 230 in executing various functions.

In one embodiment, the data store 240 may include the context information 250, the task descriptor 260, the delay parameter 270, and the state space 280. The scheduling system 170 fairly schedules execution of computing tasks on a server according to the context information 250, the task descriptor 260, the delay parameter 270, and the state space 280. The context information 250 may specify, for example, the computing power, the storage usage, the memory size, the location, the resource usage history, the computing task complexity, the computing task size, the current system status, or the wireless connection quality in the wireless network for vehicle 100. In one approach, context information 250 may include information from the state space 280. Examples of elements of the task descriptor 260 are given in Table 1. The task descriptor 260 may specify a task identification (ID) value and a delay tolerance for the computing task. The task descriptor 260 may also include a potential task partition scheme that specifies the number of subtasks and quantifies the computation complexity of each partitioned subtask. In one approach, the scheduling system 170 may utilize the specified delay tolerance to update delay parameter 270 to reduce end-to-end delays associated with vehicle 100 by offloading and partitioning a computing task.

TABLE 1

| Item | Example |
| --- | --- |
| Task Identification (Id) | 1, 5, 65, . . . |
| Number of Subtasks | 10, 24, 43, . . . |
| Computation Capability of Sub tasks | [1.2, 23.42, 30.3] GFLOP . . . |
| Delay Tolerance | 0.1, 1.5 second . . . |

The scheduling module 220 may use one or more of the elements of the context information 250 and the task descriptor 260 to determine if criteria for using computing resources associated with the server are satisfied. For example, the criteria for executing a computing task within the vehicle 100 on the server may be that a current computing task has a critical delay requirement and size that the computing resources and memory in the vehicle 100 cannot satisfy. The scheduling module 220 may also determine that the current usage of the server by other vehicles is low. In one or more embodiments, the scheduling module 220 factors the historical usage of vehicles in the area to determine if a server can tolerate the offloading of the current computing task. Thus, the scheduling module 220 optimizes delays and the fairness of scheduling vehicles in a networked environment according to processor usage and memory size of each vehicle and system status for a certain environment.

Continuing with FIG. 2 and the manner in which the scheduling system 170 implements the fair scheduling of offloaded computing tasks to a server, the partitioning module 230 may selectively partition a computing task within the vehicle 100 into one or more subtasks if the criteria are satisfied. Similar to the scheduling module 220, the partitioning module 230 may use the context information for a machine learning module to decide partitions of the computing task to reduce delays. For example, the scheduling system 170 partitions a complex computing task associated with detecting an object into two subtasks. The scheduling system 170 and the scheduling module 220 may determine that one of the subtasks should be executed on a server to reduce processing delays for the vehicle 100 that is currently overloaded with computing tasks.

The vehicle 100 may partition computing tasks into multiple sequential sub-tasks according to decisions made by the partitioning module 230. For example, a subtask may be perception, planning, controlling, or the like associated with an autonomous driving module(s) 160 for autonomously driving vehicle 100. The vehicle 100 may process each subtask from an incoming source of data from sensor data 119 into lesser amounts of data to complete the subtask. For example, the large amount of sensor data from a point cloud or fog is processed in the perception stage, which generates small amount of data after processing, features of detected lanes, objects, or the like. The scheduling system 170 may factor these parameters and others provided in task descriptor 260 to fairly offload a computing task.

As explained in more detail in method 300, the partitioning module 230 may also utilize artificial intelligence, deep reinforcement learning (DRL), a convolutional neural network (CNN), or the like to make decisions for partitioning a computing task from the vehicle 100 at least according to context information 250. In one approach, the partitioning module 230 may utilize a mode-free DRL agent to partition a computing task in real-time to improve end-to-end delay performance of offloading vehicle computing tasks.

In addition, in one embodiment, the partitioning module 230 partitions a task when the scheduling module 220 determines that a computing task should be scheduled according to the satisfaction of the aforementioned criteria. In one approach, the partitioning module 230 may partition the computing task according to the current system status specified in the context information 250 or state space 280. The scheduling system 170 and DRL agent may use a state space given in Table 2, for example, that specifies a current system status and vehicle status for fairly scheduling vehicle computing tasks in a networked environment.

TABLE 2

| Categories | Item | Example |
| --- | --- | --- |
| System Status | Number of Active Vehicles | 1, 10, 100 . . . |
|  | Service Queue Length in Server | 1, 10, 50 . . . |
|  | Number of Tasks on Transmission | 10, 100 . . . |
|  | Avg. Wireless Channel Quality of Vehicles | −70, −80, −90 dBm . . . |
|  | Predicted Network Traffic | 1, 10, 100 vehicle/second . . . |
| Vehicle Status | Computation Capability | 0.1, 2GFLOPS . . . |
|  | Wireless Channel Quality | −70, −80, −90 dBm . . . |
|  | Geographic location | [10.32, 23.42] . . . |
|  | Vehicle Speed | 20, 30, 50 MPH . . . |
|  | Delay Tolerance | 0.1, 1.5 second . . . |
|  | Number of Sub tasks | 10, 40, 80 . . . |
|  | Subtask Sizes | [1.2, 0.2, 0.01]MB . . . |
|  | Subtask Computation Complexity | 0.1, 2GFLOP . . . |

A DRL agent of the partition module 230 may use one or more network parameters in a state space for performing partitioning decisions of a computing task. The system status of a state space may include, for example, values representing the number of active vehicles, a server load, the wireless channel quality of vehicles, predicted network traffic, or the like. The vehicle status may include, for example, context information from an offloading request associated with the vehicle 100. The vehicle status information may include, for example, values representing the computation capability, the wireless channel quality, the geographic location, the speed, the delay tolerance, or the like associated with the vehicle 100. The partition scheme in the vehicle status may include the number of subtasks, the subtask sizes, or the subtask computation complexity specified by the vehicle 100.

The scheduling system 170 may offload computing tasks to a server, an edge server, a cloud computing system, or the like according to the state of the environment inferred by the state space 280. As further explained in method 300 in FIG. 3, the action space of a DRL agent may be the number of subtasks as reported by the vehicle 100. The vehicle 100 may report the number of subtasks in the offloading request sent using the offloading client 172.

Figure 3:
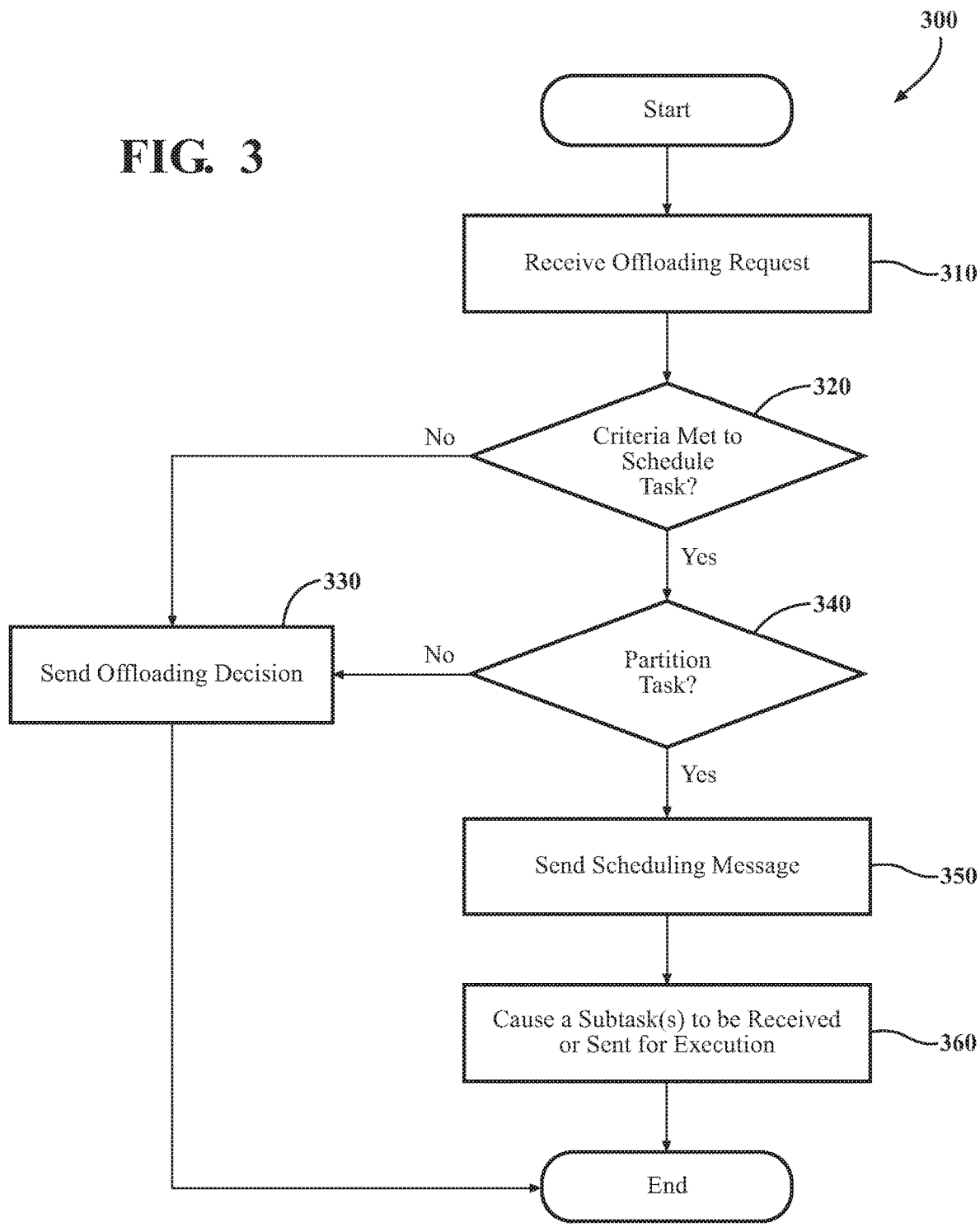
FIG. 3 illustrates one embodiment of a method that is associated with scheduling computing tasks within a vehicle to execute on a server.

FIG. 3 illustrates one embodiment of a method that is associated with scheduling computing tasks within a vehicle to execute on a server. Method 300 will be discussed from the perspective of the scheduling system 170 of FIG. 2. While method 300 is discussed in combination with the scheduling system 170, it should be appreciated that the method 300 is not limited to being implemented within the scheduling system 170 but is instead one example of a system that may implement the method 300.

As a brief introduction to the method 300, prior to the discussion of the explicitly identified functions, the scheduling system 170, in one or more embodiments, determines scheduling of a computing task for execution on a server, edge server, or the like according to the context information 250 and the task descriptor 260 received in offloading request transmitted by the vehicle 100. The scheduling module 220, in one approach, schedules the computing task if the information in the context information and the task descriptor satisfy the criteria for using computing resources associated with the server. The criteria may factor and weigh, for example, computing capabilities of the vehicle, computing capabilities of the server, current delay requirements of the computing task, computing task size, or the like.

Furthermore, the partition module 230 may partition the computing task associated with the vehicle 100 if the criteria are met. The partitioning is performed using a machine learning component that may divide the computing task into multiple subtasks according to the state of the environment. The machine learning system may optimize the scheduling and the partitioning of the scheduling system 170 by predicting the load on the network and the computing environment. The scheduling system 170 transmits the scheduling message to vehicle 100 that includes the scheduling information decision and the task partition information determined by the partition module 230.

The vehicle 100 may partition the computing task according to the task partition information in the scheduling message. The vehicle 100 may transmit the partitioned subtask to the server for execution. The vehicle 100 may run and execute on-vehicle subtasks not scheduled for offloading and execution by the server. The server may transmit the results of the execution of the subtask to the vehicle 100.

Referring again to scheduling computing tasks for execution on a server in FIG. 3, at 310 the scheduling system 170 receives an offloading request for a computing task from offloading client 172. For example, the vehicle 100 may transmit the offloading request over a wired or wireless network. The offloading request includes, for example, the context information 250 and the task descriptor 260 associated with the vehicle 100.

At 320, the scheduling module 220 schedules a computing task if the criteria for using computing resources associated with the server, according to the context information 250 and the task descriptor 260, are satisfied. In one approach, the scheduling module 220 may determine the scheduling decision according to the vehicle computation capability, the resource usage, the wireless quality, the current system status, or the like. The criteria for executing a computing task within the vehicle 100 on the server may be that a current computing task has a critical delay requirement and size that the computing resources and memory in the vehicle 100 cannot satisfy. In this way, scheduling of computing tasks for execution at a server are optimized by reducing delays and improving fairness.

Furthermore, the scheduling module 220 may utilize a resource occupation index:

$$H_t = \sum_{i=t-T}^{t} s_t.$$ Equation (1)

In Equation (1), $s_t$ may denote the computation complexity of a computing task requested for offloading by a particular vehicle at the time slot t under a time period T. The scheduling module 220 may determine the following average:

$$\frac{1}{N}\sum_{k=1}^{N} H_k.$$ Equation (2)

In equation (2), N may represent the time period for calculating a server or channel resource occupation index in units of time. In one approach, the scheduling module 220 may trace back N time periods instead of counting substantially all occupation periods. The scheduling module 220 may schedule the vehicle at time slot t if the result of Equation (2) is larger than $H_t$. In this way, satisfying these criteria improves fairness of scheduling vehicles in a computing environment by counting time periods.

At 330, if the vehicle is not scheduled, the scheduling system 170 may send a denial for offloading the computing task to a server. For example, if vehicle 100 is configured with a powerful built-in processor 110 and wireless channel quality is poor, the scheduling result may be for the offloaded computing of the vehicle 100 to fully process locally. In this scenario, the local processing delay of a vehicle computing task may be smaller than offloading due to the long transmission delay in a wireless channel. The vehicle 100 receiving a denied offloading request may trigger a backoff time according to a distributed coordination function (DCF). For example, vehicle 100 may wait before sending the next offloading request as follows:

$$T_w = R \times t$$ Equation (3)

In Equation (3), t is the minimum time slot in the system and R=random(0, $2^k$−1) is a non-negative number generated randomly. Furthermore, k is the number of consecutive denied time of vehicle 100. Using Equation (3), vehicle 100 backs off for an appropriate time and the scheduling system 170 avoids collision of offloading requests from multiple vehicles in an area.

At 340, if the criteria are satisfied, the partitioning module 230 may partition the computing task into subtasks using a machine learning module that decides partitions according to the context information 250. The scheduling system 170 may utilize the context information 250 from vehicle 100 to update the state space 280. When the partition module 230 utilizes a DRL agent, the action space may be the number of subtasks for the vehicle 100 reported using the offloading client 172. For example, if the computing task of a vehicle is 100, a possible partition schemes of 0, 1, . . . 9 may be available for the partition. Part of the partitioning module 230 may include a reward function of the DRL agent optimized to reduce or improve an end-to-end delay of the vehicle computing task. In this way, the partition module 230 uses machine learning that is trained according to the environment thereby optimizing or improving the policy of a DRL agent.

At each time slot, the DRL agent may observe a state from an environment, make an action according to a predetermined policy, and get a reward from the computing or network environment. In one approach, a neural network may parameterize the predetermined policy. An environment may be a computing, driving, network, or the like environment. The environment transits to a next state according to the action from the DRL agent. The DRL agent maximizes the cumulative rewards from the environment by optimizing the DRL agent's policy. In one approach, an advantage of a DRL with a neural network parameterized policy is able to handle a complex environment with a Markovian property. For example, a complex environment may be an area with a large number of vehicles with unique computing tasks, computation capabilities, wireless channel quality, or the like. Also, complexity for a given area are requests for offloading computing tasks associated with each vehicle arriving in different time slots or asynchronously. Moreover, once a vehicle offloading request arrives, the offloading decision and task partition for a given vehicle can affect the system state since vehicles share the common infrastructures, server, edge server, wireless channel, base station, or the like.

At 350, the scheduling system 170 may send a scheduling signal including a scheduling message to the vehicle 100. In one approach, the scheduling message includes the scheduling information and the task partition information associated with offloading the computing task. The vehicle 100 may use the scheduling information and the task partition information for processing and partitioning the computing task.

At 360, in one embodiment, the vehicle 100 uses a wired or wireless network, that is shared by other vehicles in the network, to transmit the partitioned subtask to the server for execution. In one approach, the server may be an edge server, a part of distributed network edge servers, or the like that is co-located or part of the scheduling system 170. In other approaches, the server may be an edge server, a part of distributed network edge servers, or the like that is remote or independent of the scheduling system 170. The vehicle 100 may subsequently partition the computing task according to the task partition information in the scheduling message. The partitioned subtask may be transmitted to the server for execution by the vehicle 100. The vehicle 100 may also run on-vehicle subtasks not scheduled for offloading and execution by the server. The server may transmit the results of the execution to the vehicle 100. The scheduling system 170 may record the end-to-end delay for processing the offloaded subtask for training. In one approach, vehicle 100 may subsequently trigger a subsequent offloading request to the scheduling system 170.

Figure 4:
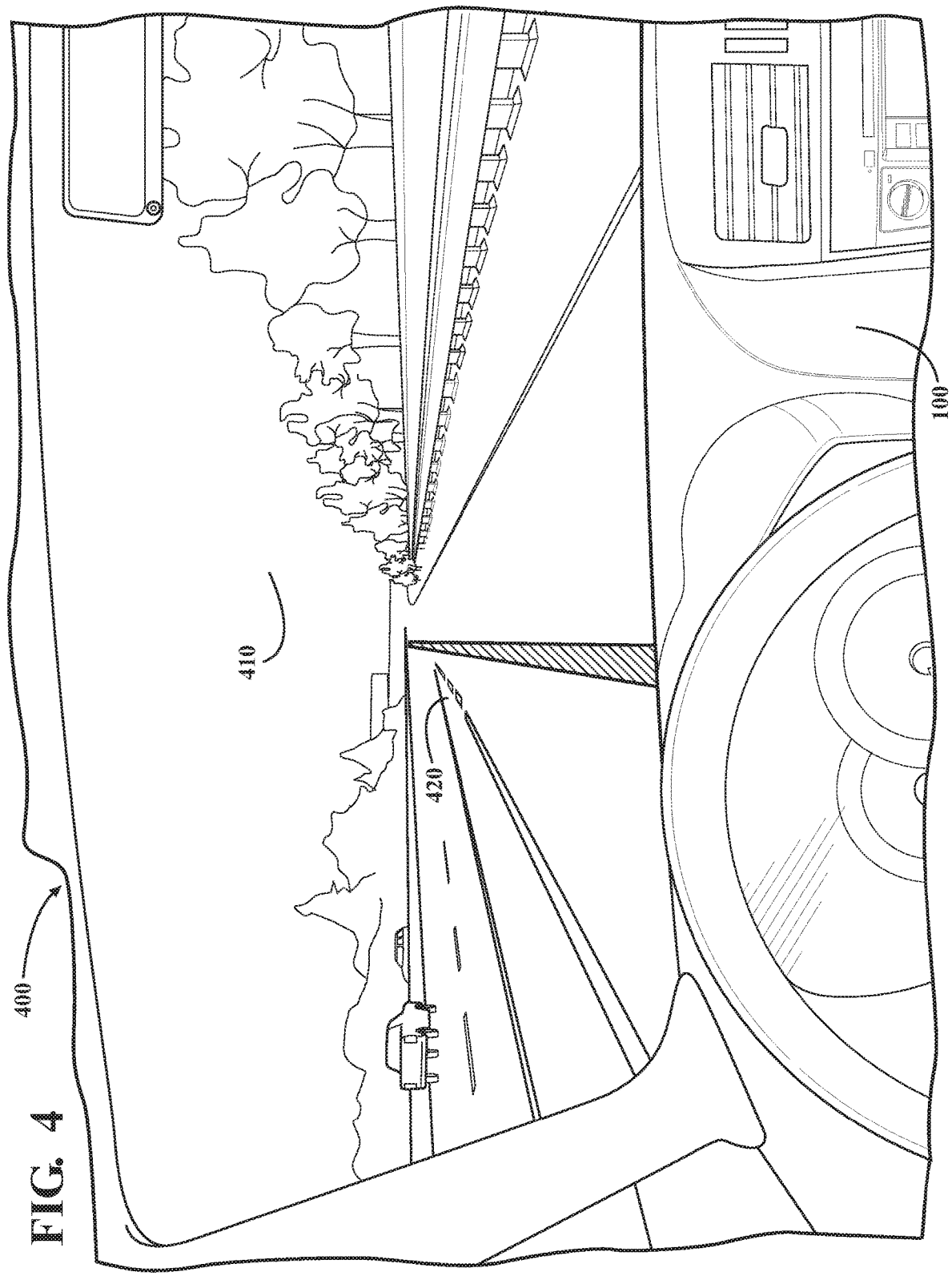
FIG. 4 is a diagram that illustrates a vehicle driving environment to offload and schedule computing tasks for a server.

FIG. 4 is a diagram illustrating a vehicle driving environment 400 to offload and schedule computing tasks for a server. In FIG. 4, the driving environment 410 may include the vehicle 100 traveling on the expressway 420 with another vehicle in the left lane. The vehicle 100 and other vehicles may be connected to a wireless network for Internet Access, vehicle-to-vehicle communication, or the like. The vehicle 100 may be traveling in active ADS mode that requires a complex computing task. For instance, the vehicle 100 may request offloading of a complex perception, planning, controlling, or the like computing task associated with an autonomous driving module(s) 160 autonomously driving vehicle 100. The scheduling system 170 may receive and process the request for offloading the complex computing task to a server for execution according to QoS, delay requirements, the computing state driving of environment, or the like. On one approach, the scheduling system 170 may send a scheduling message or offloading denial to vehicle 100 according to fair usage of server resource and delay optimization.

Figure 5:
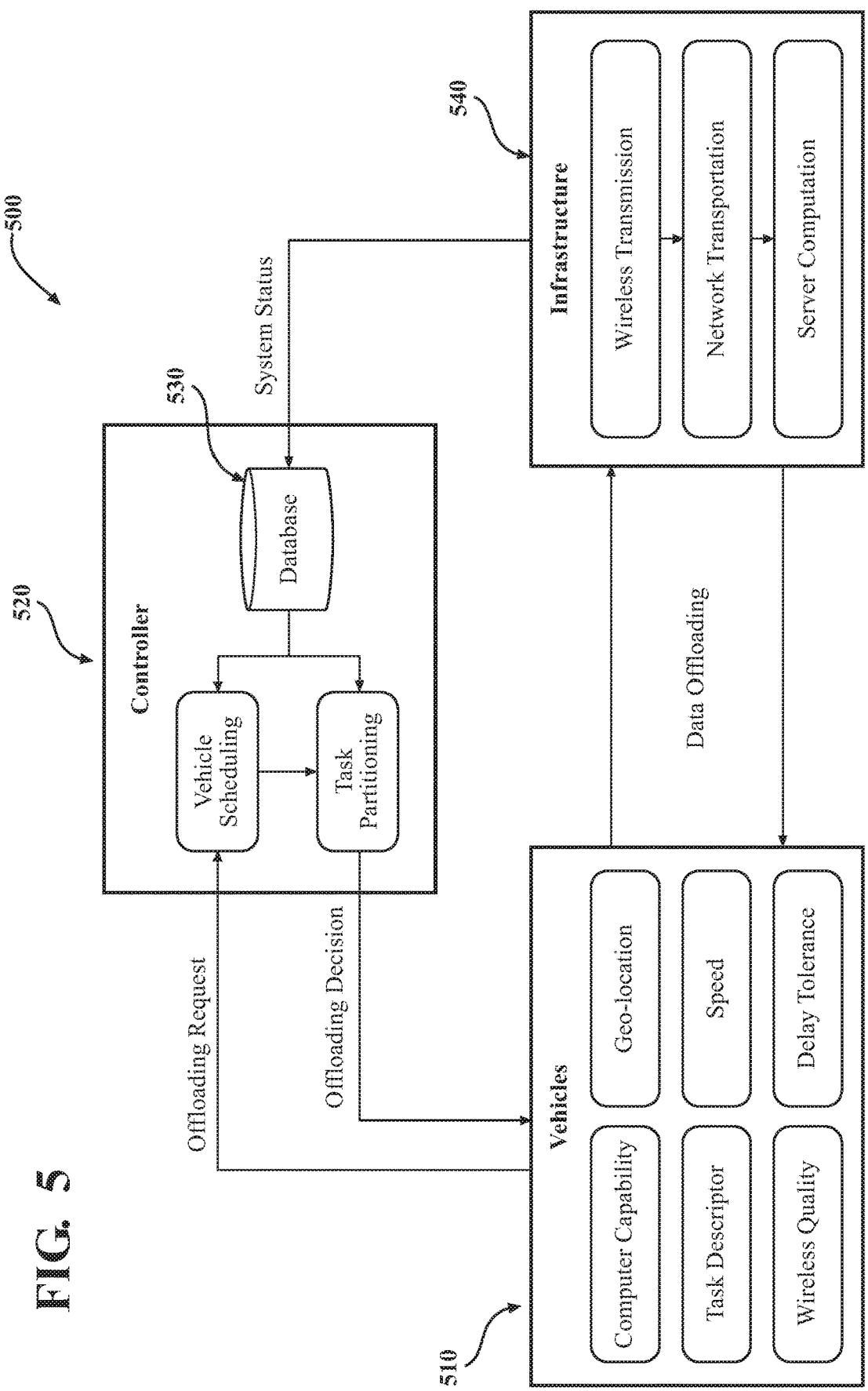
FIG. 5 is a diagram that illustrates a system for scheduling computing tasks within a vehicle to execute on a server in a mobile environment.

FIG. 5 is a diagram that illustrates a system for scheduling computing tasks within a vehicle to execute on a server in a mobile environment 500. The controller 520 may use a vehicle scheduling module, a task partitioning module, and database 530 to process offloading requests from one or more vehicles 510. For processing offloading requests, as an example, the vehicle scheduling module may operate similar to the scheduling module 220 and the task partitioning module similar to the partitioning module 230. The vehicles 510 may send context information to the controller 520 that may include computing capabilities, a task descriptor(s), wireless quality of a connection, geo-location, speed, delay tolerance, or the like.

For making an offloading scheduling decision, the vehicle scheduling module or the task partitioning module may utilize historical information, system status information, vehicle(s) status information, or the like stored in database 530. For example, system status information may be received from infrastructure component 540 to determine available server computation resources to execute offloaded tasks. In one approach, the infrastructure component 540 may be an edge server, a part of distributed network edge servers, or the like that is co-located or part of controller 520 (not shown). In other approaches, the infrastructure component 540 may be an edge server, a part of distributed network edge servers, or the like remote or independent of controller 520. In another approach, both controller 520 and infrastructure component 540 may be part of or integrated in a cellular base station, Node-b, eNodeB, or the like.

If the offloading decision is to schedule a computing task, the scheduling information and task partition information associated with offloading a subtask of the computing task may be transmitted to one of vehicles 510. The one of vehicles 510 may subsequently partition the computing task according to the task partition information in the offloading decision. The partitioned subtask may be transmitted, such as by wireless transmission, to the infrastructure component 540 for execution. The vehicle 100 may also run on-vehicle subtasks not scheduled for offloading and execution by the server. The infrastructure component 540 may transmit the results of the execution of the subtask to the one of vehicles 510.

Figure 6:
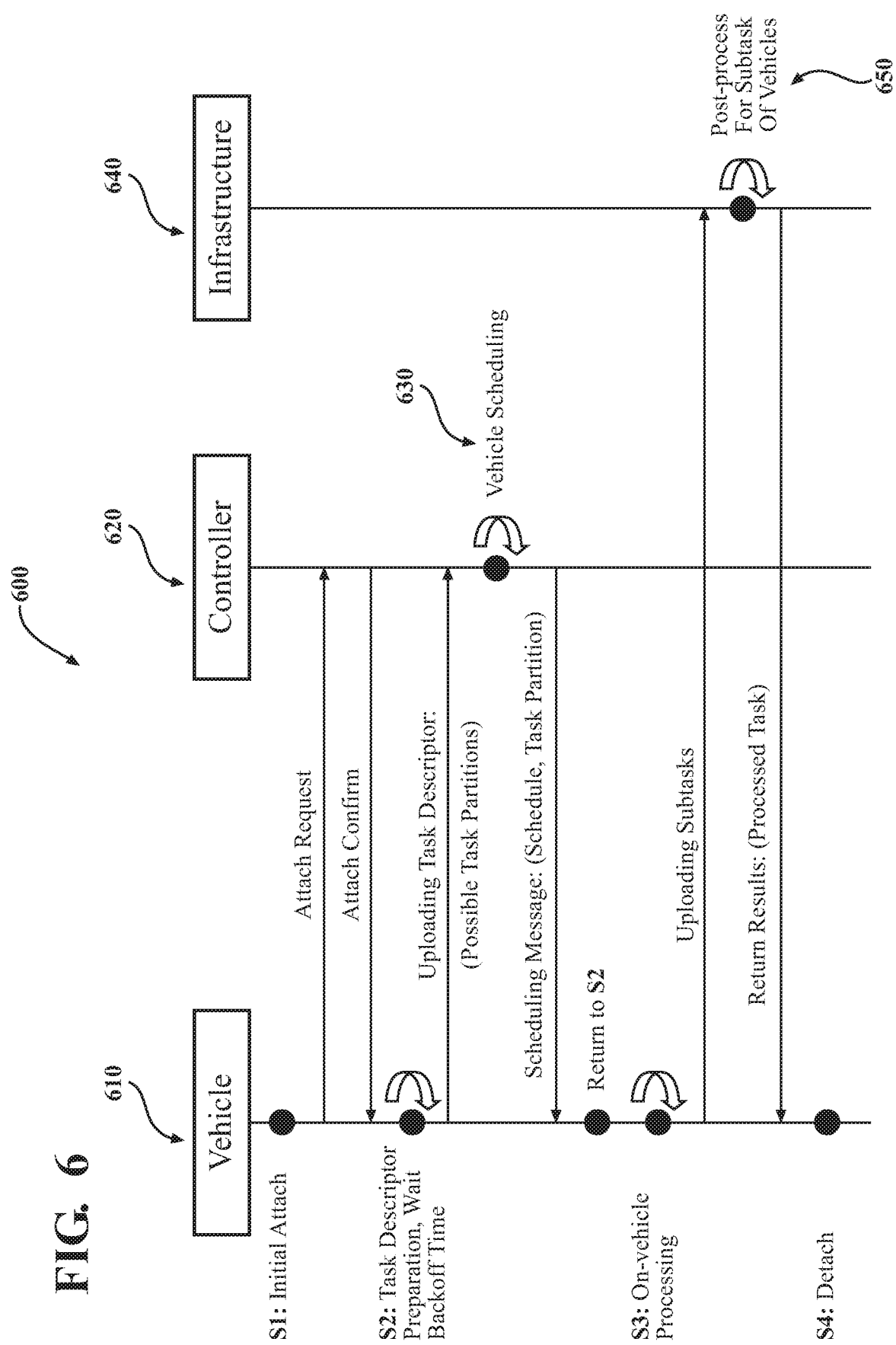
FIG. 6 is a diagram that illustrates a communication protocol between a vehicle, a controller, and infrastructure to schedule computing tasks within a vehicle.

FIG. 6 is a diagram that illustrates a communication protocol between a vehicle, a controller, and infrastructure to schedule computing tasks within a vehicle 600. At S1, a vehicle 610 may attach to the controller 620. In particular, the vehicle 610 may initialize and transmit an attachment request to the controller 620 to connect to a network. The controller 620 may confirm the attachment request by transmitting an attach confirm message.

At S2, the vehicle 610 may generate the related vehicle context information of on-vehicle computation capability, wireless channel quality, or the like. The vehicle 610 may also generate a computing task descriptor. The vehicle 610 may transmit the offloading request to the controller 620 after a backoff time. The initial backoff time, for example, may be zero or calculated as explained herein. At 630, the controller 620 may determine if the computing task for vehicle 610 will be scheduled for execution by the infrastructure 640 for the current timeslot according to satisfying the aforementioned criteria given above. In one approach, the infrastructure 640 may be an edge server, a part of distributed network edge servers, or the like that is co-located or part of controller 620. In another approach, the infrastructure 640 may be an edge server, a part of distributed network edge servers, or the like that is remote or independent of controller 620.

Furthermore, the controller 620 may also determine how to partition the computing task of vehicle 610 at the current time slot according to the aforementioned fairness criteria and machine learning operations given above. The vehicle 610 may receive a scheduling message from the controller 620 confirming or denying the scheduling of the computing task for offloading. If scheduling is denied, the vehicle 610 goes back to S2 with an increased backoff time. If scheduling is confirmed, the vehicle 610 may confirm the computing task schedule and partitioning. The vehicle 610 may partition the computing task into subtasks, start the on-vehicle computations, and transmit or upload a particular subtask(s) to the infrastructure 640 for post-processing and execution 650. In one approach, the vehicle 610 may wirelessly transmit the particular subtask using a network transport protocol. Moreover, infrastructure 640 may transmit the results of executing or processing the particular subtask to vehicle 610 upon completion of the post-processing and execution 650. At S4, vehicle 610 may also detach from the communication with controller 620.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As an autonomous vehicle, vehicle 100 may be configured to use an ADS to perform autonomous functions through the autonomous driving module(s) 160. As used herein, "autonomous vehicle" refers to a vehicle that is capable of operating in an autonomous, automated, or ADS mode (e.g., category 5, full automation). "Autonomous mode" or ADS mode refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain map(s) 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more light detection and ranging (LIDAR) sensors 124 of the sensor system 120.

The sensor data 119 includes at least the vehicle control inputs. The vehicle control inputs comprise, in one example, steering inputs (e.g., steering wheel angle, rate and direction of rotation, etc.), braking inputs (e.g., the extent of brake pedal activation/pressure), and acceleration inputs (e.g., the extent of accelerator pedal activation/pressure). In further aspects, the vehicle control inputs also specify transmission control inputs (e.g., gear selection), drive mode (e.g., 2-wheel drive, 4-wheel drive, etc.), engine/motor parameters (e.g., engine RPM, driving mode for hybrid vehicles, etc.), and so on. In yet further aspects, the sensor data 119 includes current dynamics data such as angular velocity, g-forces (e.g., longitudinal, lateral, etc.), speed profile, wheel speeds, activation controls (e.g., anti-lock brake system (ABS) activation, traction control activation, stability control activation, etc.), and so on.

In some instances, at least a portion of the map data 116 and/or the sensor data 119 can be located in one or more data stores 115 located on-board the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be performed, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect a position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangements or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geo-location system.

The processor(s) 110 and/or the autonomous driving module(s) 160 can be operatively connected to communicate with the various vehicle systems 140 and/or individual components thereof. For example, the processor(s) 110 and/or the autonomous driving module(s) 160 can be in communication to send and/or receive information from the various vehicle systems 140 to control the movement of the vehicle 100. The processor(s) 110 and/or the autonomous driving module(s) 160 may control some or all of the vehicle systems 140 and, thus, may be partially or fully autonomous as defined by the Society of Automotive Engineers (SAE) 0 to 5 levels.

As another example, the processor(s) 110 and/or the autonomous driving module(s) 160 can be operatively connected to communicate with the various vehicle systems 140 and/or individual components thereof. For example, the processor(s) 110 and/or the autonomous driving module(s) 160 can be in communication to send and/or receive information from the various vehicle systems 140 to control the movement of the vehicle 100. The processor(s) 110 and/or the autonomous driving module(s) 160 may control some or all of the vehicle systems 140.

The processor(s) 110 and/or the autonomous driving module(s) 160 may be operable to control the navigation and maneuvering of the vehicle 100 by controlling one or more of the vehicle systems 140 and/or components thereof. For instance, when operating in an automated or autonomous mode, the processor(s) 110, and/or the autonomous driving module(s) 160 can control the direction and/or speed of the vehicle 100. The processor(s) 110 and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components responsive to receiving signals or other inputs from the processor(s) 110 and/or the autonomous driving module(s) 160. For instance, the one or more actuators 150 can include motors, pneumatic actuators, hydraulic pistons, relays, solenoids, piezoelectric actuators, or the like.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source such as determinations from the sensor data as implemented by an occupancy module. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, reversing, or the like. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN), or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A scheduling system for improving scheduling of computing tasks of a vehicle in a mobile environment, comprising:
one or more processors;
a memory communicably coupled to the one or more processors and storing:
a scheduling module including instructions that when executed by the one or more processors cause the one or more processors to:
receive, by a controller from the vehicle over a network, an offloading request associated with a computing task, wherein the offloading request includes context information and a task descriptor related to the computing task; and
schedule, by the controller, the computing task to execute on a server if the context information and the task descriptor satisfy criteria for using computing resources, wherein satisfying the criteria comprises a comparison of an average computation complexity of the computing task over multiple time periods against a computation complexity at a time slot;
a partitioning module including instructions that when executed by the one or more processors cause the one or more processors to:
partition, by the controller, the computing task into subtasks when the criteria are satisfied, wherein the instructions to partition further include to use a machine learning model that decides partitions of the computing task according to the context information, and wherein the machine learning model uses reinforcement learning that processes state data about the network for training;
the scheduling module includes instructions to:
send a scheduling signal including a scheduling message having scheduling information and task partition information associated with offloading a subset of the subtasks when the criteria for using the computing resources are satisfied, or send the scheduling signal including denial information for the offloading request when the criteria for using the computing resources are unsatisfied, wherein the denial information triggers a backoff period derived from a number of consecutive times for offloading denials; and
execute, by the server responsive to the criteria for using the computing resources being satisfied, the subset of the subtasks from the vehicle.

2. The scheduling system of claim 1, wherein the scheduling module further includes instructions to send the scheduling signal including instructions to generate the scheduling signal with an indication that the offloading request is denied when the criteria are not satisfied from the context information having a memory size for the computing task that is available in the vehicle.

3. The scheduling system of claim 1, wherein the scheduling module further includes instructions to send the scheduling signal including instructions for the subset of the subtasks to be sent by an offloading client from the vehicle to the server in response to the context information and the task descriptor satisfying the criteria.

4. The scheduling system of claim 1, wherein the partitioning module further includes instructions for the machine learning model to decide partitioning of the computing task into the subtasks using a deep reinforcement learning agent, wherein the deep reinforcement learning agent decides partitions of the computing task according to satisfying a delay parameter for end-to-end delay associated with the vehicle.

5. The scheduling system of claim 1, wherein the context information includes information associated with the vehicle for one of computing power, storage usage, memory size, location, resource usage history, computing task complexity, a computing task size, and wireless connection quality in the network.

6. The scheduling system of claim 1, wherein the partitioning module further includes instructions for the machine learning model to decide partitioning of the computing task into the subtasks using a deep reinforcement learning agent, wherein the deep reinforcement learning agent decides partitions of the computing task according to a vehicle status associated with a state space and wherein the state space is associated with one of a state of the vehicle, the network, and the server.

7. The scheduling system of claim 1, wherein the task descriptor includes one of a partition scheme, computing task complexity, computation capability for a partition, and delay tolerance.

8. A non-transitory computer-readable medium for improving scheduling of computing tasks of a vehicle in a mobile environment and including instructions that when executed by one or more processors cause the one or more processors to:
receive, by a controller from the vehicle over a network, an offloading request associated with a computing task, wherein the offloading request includes context information and a task descriptor related to the computing task;

schedule, by the controller, the computing task to execute on a server if the context information and the task descriptor satisfy criteria for using computing resources, wherein satisfying the criteria comprises a comparison of an average computation complexity of the computing task over multiple time periods against a computation complexity at a time slot;

partition, by the controller, the computing task into subtasks when the criteria are satisfied, wherein the instructions to partition further include to use a machine learning model that decides partitions of the computing task according to the context information, and wherein the machine learning model uses reinforcement learning that processes state data about the network for training;

send a scheduling signal including a scheduling message having scheduling information and task partition information associated with offloading a subset of the subtasks when the criteria for using the computing resources are satisfied, or send the scheduling signal including denial information for the offloading request when the criteria for using the computing resources are unsatisfied, wherein the denial information triggers a backoff period[H] derived from a number of consecutive times for offloading denials; and execute, by the server responsive to the criteria for using the computing resources being satisfied, the subset of the subtasks from the vehicle.

9. The non-transitory computer-readable medium of claim 8, wherein the instructions to send the scheduling signal further include instructions to generate the scheduling signal with an indication that the offloading request is denied when the criteria are not satisfied from the context information having a memory size for the computing task that is available in the vehicle.

10. The non-transitory computer-readable medium of claim 8, wherein the instructions to send the scheduling signal includes for the subset of the subtasks to be sent by an offloading client from the vehicle to the server in response to the context information and the task descriptor satisfying the criteria.

11. The non-transitory computer-readable medium of claim 8, wherein the instructions to partition the computing task into the subtasks further include instructions for the machine learning model to decide partitioning of the computing task into the subtasks using a deep reinforcement learning agent, wherein the deep reinforcement learning agent decides partitions of the computing task according to satisfying a delay parameter for end-to-end delay associated with the vehicle.

12. The non-transitory computer-readable medium of claim 8, wherein the context information includes information associated with the vehicle for one of computing power, storage usage, memory size, location, resource usage history, computing task complexity, a computing task size, and wireless connection quality in the network.

13. The non-transitory computer-readable medium of claim 8, wherein the instructions to partition the computing task into the subtasks further include instructions for the machine learning model to decide partitioning of the computing task into the subtasks using a deep reinforcement learning agent, wherein the deep reinforcement learning agent decides partitions of the computing task according to a vehicle status associated with a state space and wherein the state space is associated with one of a state of the vehicle, the network, and the server.

14. A method for improving scheduling of computing tasks of a vehicle in a mobile environment, the method comprising:

receiving, by a controller from the vehicle over a network, an offloading request associated with a computing task, wherein the offloading request includes context information and a task descriptor related to the computing task;

scheduling, by the controller, the computing task to execute on a server if the context information and the task descriptor satisfy criteria for using computing resources, wherein satisfying the criteria comprises a comparison of an average computation complexity of the computing task over multiple time periods against a computation complexity at a time slot;

partitioning, by the controller, the computing task into subtasks when the criteria are satisfied, wherein the partitioning includes using a machine learning model that decides partitions of the computing task according to the context information, and wherein the machine learning model uses reinforcement learning that processes state data about the network for training;

sending a scheduling signal including a scheduling message having scheduling information and task partition information associated with offloading a subset of the subtasks when the criteria for using the computing resources are satisfied, or sending the scheduling signal including denial information for the offloading request when the criteria for using the computing resources are unsatisfied, wherein the denial information triggers a backoff period derived from a number of consecutive times for offloading denials; and executing, by the server responsive to the criteria for using the computing resources being satisfied, the subset of the subtasks from the vehicle.

15. The method of claim 14, wherein the sending the scheduling signal further includes generating the scheduling signal with an indication that the offloading request is denied when the criteria are not satisfied from the context information having a memory size for the computing task that is available in the vehicle.

16. The method of claim 14, wherein the sending the scheduling signal causes the subset of the subtasks to be sent by an offloading client from the vehicle to the server in response to the context information and the task descriptor satisfying the criteria.

17. The method of claim 14 further comprising the machine learning model decides partitioning of the computing task into the subtasks using a deep reinforcement learning agent, wherein the deep reinforcement learning agent decides partitions of the computing task according to satisfying a delay parameter for end-to-end delay associated with the vehicle.

18. The method of claim 14, wherein the context information includes information associated with the vehicle for one of computing power, storage usage, memory size, location, resource usage history, computing task complexity, a computing task size, and wireless connection quality in the network.

19. The method of claim 14 further comprising the machine learning model decides partitioning of the computing task into the subtasks using a deep reinforcement learning agent, wherein the deep reinforcement learning agent decides partitions of the computing task according to a vehicle status associated with a state space and wherein the state space is associated with one of a state of the vehicle, the network, and the server.

20. The method of claim 14, wherein the task descriptor includes one of a partition scheme, computing task complexity, computation capability for a partition, and delay tolerance.

* * * * *

UNITED STATES PATENT AND TRADEMARK OFFICE
CERTIFICATE OF CORRECTION

| | | |
|---|---|---|
| PATENT NO. | : 11,614,962 B2 | Page 1 of 1 |
| APPLICATION NO. | : 16/911585 | |
| DATED | : March 28, 2023 | |
| INVENTOR(S) | : Qiang Liu and BaekGyu Kim | |

It is certified that error appears in the above-identified patent and that said Letters Patent is hereby corrected as shown below:

In the Claims

In Claim 8, Column 21, Line 25, please replace "period[H]" with "period".

Signed and Sealed this
Ninth Day of May, 2023

Katherine Kelly Vidal
*Director of the United States Patent and Trademark Office*